(12) United States Patent
Urata et al.

(10) Patent No.: US 10,662,319 B2
(45) Date of Patent: May 26, 2020

(54) RUBBER COMPOSITION AND TIRE

(71) Applicant: BRIDGESTONE CORPORATION, Chuo-ku Tokyo (JP)

(72) Inventors: Tomohiro Urata, Nishitokyo (JP); Seiichi Tahara, Higashimurayama (JP)

(73) Assignee: BRIDGESTONE CORPORATION, Chuo-ku, Tokyo (JP)

(*) Notice: Subject to any disclaimer, the term of this patent is extended or adjusted under 35 U.S.C. 154(b) by 0 days.

(21) Appl. No.: 16/343,518

(22) PCT Filed: Oct. 12, 2017

(86) PCT No.: PCT/JP2017/037011
§ 371 (c)(1),
(2) Date: Apr. 19, 2019

(87) PCT Pub. No.: WO2018/074320
PCT Pub. Date: Apr. 26, 2018

(65) Prior Publication Data
US 2019/0264010 A1   Aug. 29, 2019

(30) Foreign Application Priority Data

Oct. 19, 2016 (JP) ................. 2016-205197

(51) Int. Cl.
  C08L 9/06 (2006.01)
  B60C 1/00 (2006.01)
  C08L 7/00 (2006.01)
  C08L 91/06 (2006.01)
  C08L 21/00 (2006.01)

(52) U.S. Cl.
  CPC ............... *C08L 9/06* (2013.01); *B60C 1/00* (2013.01); *B60C 1/0016* (2013.01); *B60C 1/0025* (2013.01); *C08L 7/00* (2013.01); *C08L 21/00* (2013.01); *C08L 91/06* (2013.01)

(58) Field of Classification Search
CPC combination set(s) only.
See application file for complete search history.

(56) References Cited

U.S. PATENT DOCUMENTS

| 3,423,348 A | 1/1969 | Eigenfeld et al. |
| 3,826,735 A | 7/1974 | Shinomura |
| 4,877,456 A | 10/1989 | Chikamune et al. |
| 2016/0102194 A1 | 4/2016 | Kamada |
| 2016/0130426 A1* | 5/2016 | Miyazaki ............. B60C 1/00 524/186 |

FOREIGN PATENT DOCUMENTS

| JP | S4891141 A | 11/1973 |
| JP | S4945289 B | 12/1974 |
| JP | H01230648 A | 9/1989 |
| JP | H0453847 A | 2/1992 |
| JP | H05320430 A | 12/1993 |
| JP | H11181150 A | 7/1999 |
| JP | H11246706 A | 9/1999 |
| JP | 2001214002 A | 8/2001 |
| JP | 2003213043 A | 7/2003 |
| JP | 2004300361 A | 10/2004 |
| JP | 2004300362 A | 10/2004 |
| JP | 2010180286 A | 8/2010 |
| JP | 2013159666 A | 8/2013 |
| JP | 2015013955 A | 1/2015 |
| JP | 2016074847 A | 5/2016 |

OTHER PUBLICATIONS

English langauge translation of JP 11-049891, pp. 1-22, Oct. 17, 2019.*
Apr. 23, 2019, International Preliminary Report on Patentability issued in the International Patent Application No. PCT/JP2017/037011.
Jan. 9, 2018, International Search Report issued in the International Patent Application No. PCT/JP2017/037011.

* cited by examiner

*Primary Examiner* — Alexander C Kollias
(74) *Attorney, Agent, or Firm* — Kenja IP Law PC

(57) ABSTRACT

Provided is a rubber composition in which static ozone resistance, dynamic ozone resistance and discoloration resistance are highly balanced. Also provided is a tire in which static ozone resistance, dynamic ozone resistance and discoloration resistance are highly balanced. The rubber composition comprises a rubber component, a petroleum wax, and an antidegradant, wherein the petroleum wax comprises a C20-C34 hydrocarbon component and a C35 or higher hydrocarbon component, and a proportion of the C20-C34 hydrocarbon component is 15% by mass to 30% by mass and a proportion of the C35 or higher hydrocarbon component is 70% by mass to 85% by mass, based on a total mass of the C20-C34 hydrocarbon component and the C35 or higher hydrocarbon component.

15 Claims, No Drawings

RUBBER COMPOSITION AND TIRE

TECHNICAL FIELD

The present disclosure relates to rubber compositions and tires.

BACKGROUND

Tires have had the problem of early development of ozone cracking due to ozone in the air.

To address this problem, improvements to ozone crack resistance have been made by increasing the amount of antidegradants compounded into rubber compositions.

However increased amounts of antidegradants compounded into rubber compositions may result in tire products showing poor appearance due to color changes into brown during storage before sale. Thus, there has been a trade-off between ozone crack resistance (hereinafter simply "ozone resistance") and discoloration resistance.

In an aim to provide rubber compositions which can suitably prevent ozone-induced degradation in a relatively high temperature region to provide excellent appearance, PTL 1 proposes rubber compositions which comprise 1.5 parts by weight or more of a petroleum paraffin wax based on 100 parts by weight of a diene rubber, wherein the petroleum paraffin wax comprises a C38-C40 linear saturated hydrocarbon and a C38-C40 branched saturated hydrocarbon in an amount of 10% by weight or more, with the amount of the branched saturated hydrocarbon being 19% by weight or more based on the total amount of the branched and linear saturated hydrocarbons.

CITATION LIST

Patent Literature

PTL 1: JP2001214002A

SUMMARY

Technical Problem

PTL 1 merely focuses on the static ozone degradation resistance at relatively high temperatures and good appearance, i.e., not appearing white or dark brown.

As to ozone resistance, dynamic ozone resistance associated with crack resistance after a run is also as important as static ozone resistance.

An object of the present disclosure is therefore to provide a rubber composition in which static ozone resistance, dynamic ozone resistance and discoloration resistance are highly balanced.

Another object of the present disclosure is to provide a tire in which static ozone resistance, dynamic ozone resistance and discoloration resistance are highly balanced.

Solution to Problem

A rubber composition according to the present disclosure comprises a rubber component, a petroleum wax, and an antidegradant, wherein the petroleum wax comprises a C20-C34 hydrocarbon component and a C35 or higher hydrocarbon component, and a proportion of the C20-C34 hydrocarbon component is 15% by mass to 30% by mass and a proportion of the C35 or higher hydrocarbon component is 70% by mass to 85% by mass, based on a total mass of the C20-C34 hydrocarbon component and the C35 or higher hydrocarbon component.

Advantageous Effect

According to the present disclosure, it is possible to provide a rubber composition in which static ozone resistance, dynamic ozone resistance and discoloration resistance are highly balanced. According to the present disclosure, it is also possible to provide a tire in which static ozone resistance, dynamic ozone resistance and discoloration resistance are highly balanced.

DETAILED DESCRIPTION

Embodiments of the present disclosure will now be described. It should be noted that the descriptions given below are illustrative purposes only and shall not be construed as limiting the scope of the present disclosure.

Herein, "normal paraffin" refers to a linear alkane present in a petroleum wax, "isoparaffin" refers to a branched alkane present in a petroleum wax, and "non-normal paraffin" refers to a component (including a heteroatom-containing component) other than linear alkanes, present in a petroleum wax.

Herein, "C20-C34 hydrocarbon component" may be referred to as "C20-C34 component", "C35 or higher hydrocarbon component" to "C35 or higher component", "C45 or higher hydrocarbon component" to "C45 or higher component", and "C20-C25 hydrocarbon component" to "C20-C25 component."

(Rubber Composition)

A rubber composition according to the present disclosure comprises a rubber component, a petroleum wax, and an antidegradant, wherein the petroleum wax comprises a C20-C34 hydrocarbon component and a C35 or higher hydrocarbon component, and a proportion of the C20-C34 hydrocarbon component is 15% by mass to 30% by mass and a proportion of the C35 or higher hydrocarbon component is 70% by mass to 85% by mass, based on a total mass of the C20-C34 hydrocarbon component and the C35 or higher hydrocarbon component.

In the rubber composition, static ozone resistance, dynamic ozone resistance and discoloration resistance are highly balanced.

Hereinafter, a rubber component, a petroleum wax and an antidegradant, which are essential components of the rubber composition according to the present disclosure, and an optional component will be described.

<Rubber Component>

The rubber component is not particularly limited and can be selected as appropriate from those known in the art. As the rubber component, for example, natural rubber (NR) and/or synthetic rubbers can be included. Examples of synthetic rubbers include polyisoprene rubber (IR), styrene-butadiene rubber (SBR), polybutadiene rubber (BR), ethylene-propylene-diene rubber (EPDM), chloroprene rubber (CR), isobutylene isoprene rubber (IIR), halogenated butyl rubber, and acrylonitrile-butadiene rubber (NBR). As the rubber component, either an unmodified rubber or a modified rubber may be used. As the rubber component, the foregoing rubbers may be used singly or in combination of two or more at any ratio.

<Petroleum Wax>

Herein, the petroleum wax comprises a C20-C34 component and a C35 or higher component, wherein the proportion of the C20-C34 component is 15% by mass to 30% by mass and the proportion of the C35 or higher component is 70% by mass to 85% by mass, based on the total mass of the C20-C34 component and the C35 or higher component. Herein, the petroleum wax forms a wax layer on the surface of a vulcanized (cured) product of the rubber composition, such as a tire, to develop static ozone resistance, dynamic ozone resistance, and discoloration resistance.

The C20-C34 component has a function of enhancing static ozone resistance. The C35 or higher component has a function of enhancing the flexibility and temperature stability of a wax layer formed on the surface of a vulcanized (cured) product of the rubber composition, such as a tire.

When the proportion of the C20-C34 component is 15% by mass to 30% by mass and the proportion of the C35 or higher component is 70% by mass to 85% by mass based on the total mass of the C20-C34 component and the C35 or higher component, it is possible to provide a rubber composition in which static ozone resistance, dynamic ozone resistance and discoloration resistance are highly balanced. Without wishing to be bound by any theory, it is presumed that such an effect is achieved because when the C20-C34 component and the C35 or higher component are present in the proportions mentioned above, the wax layer formed on the surface of a vulcanized (cured) product of the rubber composition, such as a tire, is stabilized to reduce irregular reflection of light incident on the wax layer If the proportion of the C20-C34 component is less than 15% by mass, or the proportion of the C35 or higher component is greater than 85% by mass, based on the total mass of the C20-C34 component and the C35 or higher component, it results in failure to provide excellent static ozone resistance compared to the prior art. Further, if the proportion of the C20-C34 component is greater than 30% by mass, or the proportion of the C35 or higher component is less than 70% by mass, based on the total mass of the C20-C34 component and the C35 or higher component, it results in failure to provide excellent dynamic ozone resistance.

The C35 or higher component preferably has not more than 85 carbon atoms, more preferably not more than 80 carbon atoms.

The proportion of the C35 or higher component based on the total mass of the C20-C34 component and the C35 or higher component is 70% by mass to 85% by mass, but is preferably 70% by mass to 82% by mass from the viewpoint of the balance between discoloration resistance and static ozone resistance.

Typically, each of the C20-C34 component and the C35 or higher component contains a normal paraffin and a non-normal paraffin. It is preferred that the rubber composition according to the present disclosure comprises a non-normal paraffin in one or both of the C20-C34 component and the C35 or higher component and the proportion of the non-normal paraffins in the C20-C34 component and the C35 or higher component (i.e., the non-normal paraffin in the C20-C34 component and the non-normal paraffin in the C35 or higher component) is 35% by mass to 65% by mass, more preferably 50% by mass to 60% by mass, based on the total mass mentioned above. When the proportion of the non-normal paraffin is 35% by mass to 65% by mass based on the total mass mentioned above, it is possible to lower the crystallinity of the wax layer formed on the surface of a vulcanized (cured) product of the rubber composition, thereby making the wax layer uniform and allowing static ozone resistance and discoloration resistance to be highly balanced. It is also possible to enhance discoloration resistance of a tire and hence to allow larger amounts of antidegradants to be compounded into the rubber composition as compared to conventional rubber compositions. It is thus possible to enhance ozone resistance while reducing browning of a tire product during storage before sale. The crystallinity of the wax layer can be determined by scanning electron microscopy (SEM) observation (at 300× magnification) of a wax layer formed by allowing a vulcanized (cured) product of the rubber composition to stand for one week at 40° C.

The C35 or higher component may or may not comprise a C45 or higher component. When the C35 or higher component comprises a C45 or higher component, the proportion of the C45 or higher component may be, for example, 10% by mass to 50% by mass based on the mass of the C35 or higher component.

It is preferred that the rubber composition according to the present disclosure comprises a C45 or higher component in the C35 or higher component and the proportion of the C45 or higher component in the C35 or higher component is 20% by mass or more, more preferably 24% by mass to 40% by mass, based on the total mass mentioned above. When the proportion of the C45 or higher component is 20% by mass or more based on the total mass mentioned above, the blooming of the antidegradant to the surface of a vulcanized (cured) product of the rubber composition is moderately reduced, so that ozone resistance and discoloration resistance can be enhanced.

The C20-C34 component may or may not comprise a C20-C25 component. When the C20-C34 component comprises a C20-C25 component, the proportion of the C20-C25 component may be, for example, 1% by mass to 50% by mass based on the mass of the C20-C34 component.

It is preferred that the rubber composition according to the present disclosure comprises a C20-C25 component in the C20-C34 component and the proportion of the C20-C25 component in the C20-C34 component is 1.5% by mass to 4.5% by mass based on the total mass mentioned above. With this configuration, static ozone resistance at 10° C. or below improves.

The petroleum wax may comprise a microcrystalline wax. The amount of the microcrystalline wax in the petroleum wax is not particularly limited and may be adjusted as appropriate. For example, the amount of the microcrystalline wax in the petroleum wax may be 10% by mass to 90% by mass based on the total mass of the petroleum wax. Preferably, the amount of the microcrystalline wax in the petroleum wax is 60% by mass or more. With this configuration, dynamic ozone resistance and discoloration resistance are enhanced.

The amount of each hydrocarbon component in the petroleum wax can be determined using capillary GC (GC-17A, Shimadzu Corporation) as a gas chromatography device which uses aluminum-coated capillary column (Ultra Alloy-DX 30) under the following conditions: carrier gas=helium gas, flow rate=4 mL/min, oven temperature=160° C. to 450° C., heating rate=8° C./min, detector=FID.

The petroleum wax, as a whole petroleum wax in the rubber composition, may satisfy the mass proportions of the C20-C34 component and the C35 or higher component mentioned above. To that end, only one type of a petroleum wax which satisfies the above mass proportions may be used, or two or more petroleum waxes having different compositions which satisfy or do not satisfy the above mass proportions may be combined such that the mass proportions are satisfied as a whole. For example, microcrystalline waxes such as those available under the tradenames SUN- NOC® N (manufactured by Ouchi Shinko Chemical Industrial Co., Ltd), SUNTIGHT® SW (manufactured by Seiko Chemical Industry Co., Ltd.), and OZOACE® 0111 and OZOACE® 0301 (manufactured by Nippon Seiro Co., Ltd.) may be combined to prepare a petroleum wax which satisfies the mass proportions mentioned above.

The amount of the petroleum wax in the rubber composition may be adjusted as appropriate according to the desired performance. For example, the petroleum wax can be compounded in an amount of 0.5 parts by mass to 5 parts by mass based on 100 parts by mass of the rubber component. From the viewpoint of static ozone resistance and film thickness control, it is preferred that the rubber composition according to the present disclosure comprises the petroleum wax in an amount of 1.0 part by mass to 2.5 parts by mass, more preferably 1.1 parts by mass to 2 parts by mass, based on 100 parts by mass of the rubber component.

<Antidegradant>

The antidegradant is not particularly limited and can be selected as appropriate from those known in the art. Examples of antidegradants include aromatic secondary amine antidegradants, amine-ketone antidegradants, monophenol antidegradants, bisphenol antidegradants, polyphenol antidegradants, benzimidazole antidegradants, dithiocarbamate antidegradants, thiourea antidegradants, phosphorous acid antidegradants, organic thioacid antidegradants, and special wax antidegradants. These antidegradants may be used singly or in combination of two or more.

Examples of aromatic secondary amine antidegradants include N-phenyl-1-naphthylamine (e.g., NOCRAC® PA, manufactured by Ouchi Shinko Chemical Industrial Co., Ltd.), alkylated diphenylamine (e.g., NOCRAC® ODA, manufactured by Ouchi Shinko Chemical Industrial Co., Ltd.), octylated diphenylamine (e.g., NOCRAC® AD-F, manufactured by Ouchi Shinko Chemical Industrial Co., Ltd.), 4,4'-bis($\alpha,\alpha$-dimethylbenzyl)diphenylamine (e.g., NOCRAC® CD, manufactured by Ouchi Shinko Chemical Industrial Co., Ltd.), p-(p-toluenesulfonylamide)diphenylamine (e.g., NOCRAC® TD, manufactured by Ouchi Shinko Chemical Industrial Co., Ltd.), N,N'-di-2-naphthyl-p-phenylenediamine (e.g., NOCRAC® White, manufactured by Ouchi Shinko Chemical Industrial Co., Ltd.), N,N'-diphenyl-p-phenylenediamine (e.g., NOCRAC® DP, manufactured by Ouchi Shinko Chemical Industrial Co., Ltd.), N-phenyl-N'-isopropyl-p-phenylenediamine (e.g., NOCRAC® 810-NA, manufactured by Ouchi Shinko Chemical Industrial Co., Ltd.), N-phenyl-N-(1,3-dimethylbutyl)-p-phenylenediamine (e.g., NOCRAC® 6C, manufactured by Ouchi Shinko Chemical Industrial Co., Ltd.), and N-phenyl-N'-(3-methacryloyloxy-2-hydroxypropyl)-p-phenylenediamine (e.g., NOCRAC® G-1, manufactured by Ouchi Shinko Chemical Industrial Co., Ltd.).

The amine-ketone antidegradants, monophenol antidegradants, bisphenol antidegradants, polyphenol antidegradants, benzimidazole antidegradants, dithiocarbamate antidegradants, thiourea antidegradants, phosphorous acid antidegradants, organic thioacid antidegradants, and special wax antidegradants can also be those commercially available from Ouchi Shinko Chemical Industrial Co., Ltd.

The amount of the antidegradant in the rubber composition may be adjusted as appropriate according to the desired performance. For example, the antidegradant may be compounded in an amount of 0.5 parts by mass to 15 parts by mass based on 100 parts by mass of the rubber component.

It is preferred that the rubber composition according to the present disclosure comprises the antidegradant in an amount of 2.5 parts by mass or more, more preferably 2.5 parts by mass to 10 parts by mass, based on 100 parts by mass of the rubber component. With the antidegradant being contained in an amount of 2.5 parts by mass or more based on 100 parts by mass of the rubber component, static ozone resistance and dynamic ozone resistance of the rubber composition can be enhanced.

<Other Components>

In addition to the rubber component, the petroleum wax and the antidegradant described above, the rubber composition according to the present disclosure may optionally comprise components commonly used in the fields of rubbers and tires without departing from the spirit of the present disclosure. Examples of such optional components include fillers (e.g., carbon black and silica), stearic acid, vulcanizing agents, vulcanization accelerators, softeners, zinc oxide (zinc white), and scorch inhibitors.

<Method for Preparing Rubber Composition>

The method for preparing the rubber composition according to the present disclosure is not particularly limited and the rubber composition can be prepared by mixing the above-mentioned components by known methods and optionally further vulcanizing the resulting mixture.

(Tire)

A tire according to the present disclosure comprises a tread, a sidewall or a combination thereof in which any of the rubber compositions described above is used. The tire has static ozone resistance, dynamic ozone resistance and discoloration resistance which are highly balanced.

The method for manufacturing the tire is not particularly limited and tire manufacturing methods known in the art can be used.

EXAMPLES

The present disclosure will now be described based on Examples, which are illustrative purposes only and shall not be construed as limiting the scope of the present disclosure.

Details of materials used in Examples are as follows.

Natural rubber: SIR 20

Styrene-butadiene rubber: Nipol® 1502 (E-SBR, styrene content: 23.5% by mass, ML(1+4) 100° C.: 52), manufactured by Zeon Corporation Carbon black: SHOBLACK® N134 (specific surface area: 148 m$^2$/g), manufactured by Showa Cabot K.K.

Silica: Nipsil® AQ (BET specific surface area: 200 m$^2$/g), manufactured by Tosoh-Silica Corporation Stearic acid: stearic acid YR, manufactured by NOF Corporation Silane coupling agent: bis(3-triethoxysilylpropyl)disulfide (average sulfur chain length: 2.35), Si 75 manufactured by Evonik Industries AG Sulfur: MUCRON® OT-20, manufactured by Shikoku Chemicals Corporation Vulcanization accelerator (DPG): 1,3-diphenylguanidine, SANCELER®D, manufactured by Sanshin Chemical Industry Co., Ltd.

Vulcanization accelerator (MBTS): di-2-benzothiazolyl disulfide, SANCELER® DM, manufactured by Sanshin Chemical Industry Co., Ltd.

Vulcanization accelerator (CBS): N-cyclohexyl-2-benzothiazole sulfenamide, SANCELER® CM-G, manufactured by Sanshin Chemical Industry Co., Ltd.

Zinc white: zinc oxide III, manufactured by Seido Chemical Industry Co., Ltd.

Details of the apparatus used in Examples are as follows.

Spectrophotometer: CM-700D, manufactured by Konica Minolta (Prophetic Examples 1-12 and Prophetic Comparative Examples 1-5)

Petroleum waxes having the compositions shown in Table 1 are prepared by blending different amounts of the following microcrystalline waxes: SUNNOC® N (manufactured by Ouchi Shinko Chemical Industrial Co., Ltd), SUN-TIGHT® SW (manufactured by Seiko Chemical Industry Co., Ltd.), and OZOACE® 0111 and OZOACE® 0301 (manufactured by Nippon Seiro Co., Ltd.). Rubber compositions of Examples and Comparative Examples having the compositions shown in Table 1 are then prepared. Each rubber composition is evaluated for static ozone resistance, dynamic ozone resistance, and discoloration resistance as described below.

<Static Ozone Resistance>

In accordance with "static ozone degradation test" of JIS K 6259:2004, the size of cracks after 24 hours at an ozone concentration of 500±50 ppb (50±5 pphm), 40° C. and 20% tensile strain is measured. Static ozone resistance is evaluated based on the following criteria.

Rank 4: No cracks occurred
Rank 3: Cracks with size of 1 mm or less occurred
Rank 2: Cracks with size of more than 1 mm to 2 mm or less occurred
Rank 1: Cracks with size of more than 2 mm occurred <Dynamic Ozone Resistance>

In accordance with "dynamic ozone degradation test" of JIS K 6259:2004, a dynamic ozone degradation test is carried out for 48 hours at an ozone concentration of 50 ppm, 40° C., 0.5 Hz, and 20% elongation. The state of cracking in the test piece after testing is evaluated based on the following criteria in accordance with JIS K 6259.

Rank 4: No cracks observed by visual observation using a 20× magnifying glass
Rank 3: No cracks observed with the naked eye
Rank 2: A few cracks observed with the naked eye
Rank 1: A countless number of deep, large cracks (1 mm or more and less than 3 mm in size)

<Discoloration Resistance>

Vulcanized rubber test pieces are allowed to stand for one month in summer outdoor conditions (the test pieces are exposed to direct sunlight only during a specific period of time of the day under the roof to avoid rain) and measured for the degree of discoloration using the spectrophotometer. Discoloration resistance is evaluated based on the following b value.

Rank 4: The b value is 0 or less
Rank 3: The b value is more than 0 and 1 or less
Rank 2: The b value is more than 1 and less than 2
Rank 1: The b value is 2 or more

TABLE 1

| | | | Comp. Ex. 1 | Comp. Ex. 2 | Comp. Ex. 3 | Comp. Ex. 4 | Ex. 1 | Ex. 2 | Ex. 3 | Ex. 4 | Ex. 5 |
|---|---|---|---|---|---|---|---|---|---|---|---|
| Natural rubber | | | 20 | 20 | 20 | 20 | 20 | 20 | 20 | 20 | 20 |
| Styrene-butadiene rubber | | | 80 | 80 | 80 | 80 | 80 | 80 | 80 | 80 | 80 |
| Carbon black | | | 20 | 20 | 20 | 20 | 20 | 20 | 20 | 20 | 20 |
| Silica | | | 55 | 55 | 55 | 55 | 55 | 55 | 55 | 55 | 55 |
| Stearic acid | | | 1 | 1 | 1 | 1 | 1 | 1 | 1 | 1 | 1 |
| Silane coupling agent | | | 5 | 5 | 5 | 5 | 5 | 5 | 5 | 5 | 5 |
| Sulfur | | | 1.5 | 1.5 | 1.5 | 1.5 | 1.5 | 1.5 | 1.5 | 1.5 | 1.5 |
| Vulcanization accelerator | DPG | | 0.6 | 0.6 | 0.6 | 0.6 | 0.6 | 0.6 | 0.6 | 0.6 | 0.6 |
| | MBPS | | 2 | 2 | 2 | 2 | 2 | 2 | 2 | 2 | 2 |
| | CBS | | 0.7 | 0.7 | 0.7 | 0.7 | 0.7 | 0.7 | 0.7 | 0.7 | 0.7 |
| Zinc white | | | 3 | 3 | 3 | 3 | 3 | 3 | 3 | 3 | 3 |
| Antidegradant | | | 0 | 1 | 1 | 1 | 1 | 1 | 1 | 1 | 1 |
| Petroleum wax | Compounding amount | | 1.5 | 1.5 | 1.5 | 1.5 | 1.5 | 1.5 | 1.5 | 1.5 | 1.5 |
| | Composition (%) | C20-C34 component *1 | 54 | 12 | 35 | 54 | 18 | 18 | 18 | 27 | 27 |
| | | C20-C25 component *2 | 3.6 | 0.8 | 2.5 | 3.6 | 4.5 | 1 | 1 | 1.9 | 1.9 |
| | | C35 or higher component *3 | 46 | 88 | 65 | 46 | 82 | 82 | 82 | 73 | 73 |
| | | C45 or higher component *4 | 15 | 29 | 21 | 15 | 24 | 24 | 40 | 24 | 24 |
| | | Proportion of non-normal paraffin *5 | 20 | 65 | 40 | 20 | 40 | 50 | 50 | 30 | 35 |
| Evaluations | Static ozone resistance | | 1 | 2 | 3 | 3 | 3 | 3 | 3 | 4 | 4 |
| | Dynamic ozone resistance | | 1 | 2 | 2 | 2 | 2 | 3 | 3 | 2 | 3 |
| | Discoloration resistance | | 4 | 4 | 3 | 3 | 4 | 4 | 4 | 3 | 4 |
| Total Pts | | | 6 | 8 | 8 | 8 | 9 | 10 | 10 | 9 | 11 |

| | | | Ex. 6 | Ex. 7 | Ex. 8 | Ex. 9 | Ex. 10 | Comp. Ex. 5 | Ex. 11 | Ex. 12 |
|---|---|---|---|---|---|---|---|---|---|---|
| Natural rubber | | | 20 | 20 | 20 | 20 | 20 | 20 | 20 | 20 |
| Styrene-butadiene rubber | | | 80 | 80 | 80 | 80 | 80 | 80 | 80 | 80 |
| Carbon black | | | 20 | 20 | 20 | 20 | 20 | 20 | 20 | 20 |
| Silica | | | 55 | 55 | 55 | 55 | 55 | 55 | 55 | 55 |
| Stearic acid | | | 1 | 1 | 1 | 1 | 1 | 1 | 1 | 1 |
| Silane coupling agent | | | 5 | 5 | 5 | 5 | 5 | 5 | 5 | 5 |
| Sulfur | | | 1.5 | 1.5 | 1.5 | 1.5 | 1.5 | 1.5 | 1.5 | 1.5 |
| Vulcanization accelerator | DPG | | 0.6 | 0.6 | 0.6 | 0.6 | 0.6 | 0.6 | 0.6 | 0.6 |
| | MBPS | | 2 | 2 | 2 | 2 | 2 | 2 | 2 | 2 |
| | CBS | | 0.7 | 0.7 | 0.7 | 0.7 | 0.7 | 0.7 | 0.7 | 0.7 |
| Zinc white | | | 3 | 3 | 3 | 3 | 3 | 3 | 3 | 3 |
| Antidegradant | | | 1 | 1 | 1 | 1.5 | 2.5 | 2.5 | 5 | 1 |
| Petroleum wax | Compounding amount | | 1.5 | 1.5 | 1.5 | 1.5 | 1.5 | 1.5 | 1.5 | 3 |
| | Composition (%) | C20-C34 component *1 | 27 | 27 | 27 | 27 | 27 | 54 | 27 | 27 |
| | | C20-C25 component *2 | 1.9 | 1.9 | 1.9 | 6 | 1.9 | 3.6 | 1.9 | 1.9 |

TABLE 1-continued

| | | | | | | | | | |
|---|---|---|---|---|---|---|---|---|---|
| Evaluations | C35 or higher component *3 | 73 | 73 | 73 | 73 | 73 | 46 | 73 | 73 |
| | C45 or higher component *4 | 15 | 24 | 24 | 24 | 24 | 15 | 24 | 24 |
| | Proportion of non-normal paraffin *5 | 40 | 60 | 70 | 40 | 60 | 20 | 60 | 60 |
| | Static ozone resistance | 4 | 3 | 2 | 3 | 4 | 3 | 4 | 3 |
| | Dynamic ozone resistance | 2 | 2 | 3 | 2 | 4 | 4 | 4 | 2 |
| | Discoloration resistance | 3 | 4 | 4 | 4 | 3 | 1 | 2 | 3 |
| | Total Pts | 9 | 9 | 9 | 9 | 11 | 8 | 10 | 8 |

*1: The proportion by mass of the C20-C34 component based on the total mass of the C20-C34 component and the C35 or higher component
*2: The proportion by mass of the C20-C25 component based on the total mass of the C20-C34 component and the C35 or higher component
*3: The proportion by mass of the C35 or higher component based on the total mass of the C20-C34 component and the C35 or higher component
*4: The proportion by mass of the C45 or higher component based on the total mass of the C20-C34 component and the C35 or higher component
*5: The proportion by mass of a non-normal paraffin based on the mass of the petroleum wax.

INDUSTRIAL APPLICABILITY

According to the present disclosure, it is possible to provide a rubber composition in which static ozone resistance, dynamic ozone resistance and discoloration resistance are highly balanced. According to the present disclosure, it is also possible to provide a tire in which static ozone resistance, dynamic ozone resistance and discoloration resistance are highly balanced. The present disclosure is applicable to rubber products other than tire, such as conveyor belts, hoses, and crawlers.

The invention claimed is:

1. A rubber composition comprising a rubber component, a petroleum wax, and an antidegradant,
    wherein the petroleum wax comprises a C20-C34 hydrocarbon component and a C35 or higher hydrocarbon component, and
    a proportion of the C20-C34 hydrocarbon component is 15% by mass to 30% by mass and a proportion of the C35 or higher hydrocarbon component is 70% by mass to 85% by mass, based on a total mass of the C20-C34 hydrocarbon component and the C35 or higher hydrocarbon component,
    wherein a proportion of a C20-C25 hydrocarbon component in the C20-C34 hydrocarbon component is 1.5% by mass to 4.5% by mass based on the total mass.

2. The rubber composition of claim 1, wherein a proportion of a non-normal paraffin is 35% by mass to 65% by mass based on a mass of the petroleum wax.

3. The rubber composition of claim 1, wherein a proportion of a C45 or higher hydrocarbon component in the C35 or higher hydrocarbon component is 20% by mass or more based on the total mass.

4. The rubber composition of claim 1, wherein the antidegradant is contained in an amount of 2.5 parts by mass or more based on 100 parts by mass of the rubber component.

5. The rubber composition of claim 1, wherein the petroleum wax is contained in an amount of 1.0 part by mass to 2.5 parts by mass based on 100 parts by mass of the rubber component.

6. A tire comprising a tread, a sidewall or a combination thereof in which the rubber composition according to claim 1 is used.

7. The rubber composition of claim 2, wherein a proportion of a C45 or higher hydrocarbon component in the C35 or higher hydrocarbon component is 20% by mass or more based on the total mass.

8. The rubber composition of claim 2, wherein the antidegradant is contained in an amount of 2.5 parts by mass or more based on 100 parts by mass of the rubber component.

9. The rubber composition of claim 2, wherein the petroleum wax is contained in an amount of 1.0 part by mass to 2.5 parts by mass based on 100 parts by mass of the rubber component.

10. A tire comprising a tread, a sidewall or a combination thereof in which the rubber composition according to claim 2 is used.

11. The rubber composition of claim 3, wherein the antidegradant is contained in an amount of 2.5 parts by mass or more based on 100 parts by mass of the rubber component.

12. The rubber composition of claim 3, wherein the petroleum wax is contained in an amount of 1.0 part by mass to 2.5 parts by mass based on 100 parts by mass of the rubber component.

13. A tire comprising a tread, a sidewall or a combination thereof in which the rubber composition according to claim 3 is used.

14. The rubber composition of claim 4, wherein the petroleum wax is contained in an amount of 1.0 part by mass to 2.5 parts by mass based on 100 parts by mass of the rubber component.

15. A tire comprising a tread, a sidewall or a combination thereof in which the rubber composition according to claim 4 is used.

* * * * *